(12) United States Patent
Satomi

(10) Patent No.: US 9,041,979 B2
(45) Date of Patent: May 26, 2015

(54) IMAGE PROCESSING APPARATUS WITH EDGE OUTLINE DEFINITION ON EDGE OUTSIDE MASK RANGE OF BLACK DETERMINATION RANGE

(71) Applicant: KYOCERA Document Solutions Inc., Osaka-shi, Osaka (JP)

(72) Inventor: Seiki Satomi, Osaka (JP)

(73) Assignee: KYOCERA Document Solutions Inc., Osaka-shi (JP)

( * ) Notice: Subject to any disclaimer, the term of this patent is extended or adjusted under 35 U.S.C. 154(b) by 0 days.

(21) Appl. No.: 14/184,087

(22) Filed: Feb. 19, 2014

(65) Prior Publication Data

US 2014/0240788 A1 Aug. 28, 2014

(30) Foreign Application Priority Data

Feb. 26, 2013 (JP) ................................. 2013-036477

(51) Int. Cl.
  *G06K 15/00* (2006.01)
  *H04N 1/58* (2006.01)
(52) U.S. Cl.
  CPC ...................................... *H04N 1/58* (2013.01)
(58) Field of Classification Search
  None
  See application file for complete search history.

(56) References Cited

U.S. PATENT DOCUMENTS 6,257,693 B1 * 7/2001 Miller et al. .................... 347/19
8,064,095 B2 * 11/2011 Maki .............................. 358/1.2

FOREIGN PATENT DOCUMENTS

JP   2012095172 A   5/2012
JP   2012095173 A   5/2012

* cited by examiner

*Primary Examiner* — Steven Kau
(74) *Attorney, Agent, or Firm* — Alleman Hall McCoy Russell & Tuttle LLP

(57) ABSTRACT

An image processing apparatus includes: a color converting portion and an edge-outline-to-be-defined specifying portion. The color converting portion is configured to convert a portion near one of edges of a black determination range determined as having a composite black and a portion near the other of the edges thereof, so as to have a pure black. The edge-outline-to-be-defined specifying portion is configured to set a range, of the black determination range, positioned inward of one of the edges of the black determination range and the other of the edges of the black determination range, as a mask range, for a black plane, and specify an edge outside the mask range as an edge on which edge outline definition is to be performed.

8 Claims, 4 Drawing Sheets

US 9,041,979 B2

IMAGE PROCESSING APPARATUS WITH EDGE OUTLINE DEFINITION ON EDGE OUTSIDE MASK RANGE OF BLACK DETERMINATION RANGE

INCORPORATION BY REFERENCE

This application is based upon and claims the benefit of priority from the corresponding Japanese Patent Application No. 2013-036477 filed on Feb. 26, 2013, the entire contents of which are incorporated herein by reference.

BACKGROUND

The present disclosure relates to image processing apparatuses and image forming apparatuses.

In image forming apparatuses such as printers and multi-function peripherals, images are subjected to screen processing and images having been subjected to the screen processing are printed.

In some image processing apparatuses, edge outline definition is performed in the screen processing.

SUMMARY

An image processing apparatus according to one aspect of the present disclosure includes: a color converting portion and an edge-outline-to-be-defined specifying portion. The color converting portion is configured to convert a portion near one of edges of a black determination range determined as having a composite black and a portion near the other of the edges thereof, so as to have a pure black. The edge-outline-to-be-defined specifying portion is configured to set a range, of the black determination range, positioned inward of one of the edges of the black determination range and the other of the edges of the black determination range, as a mask range, for a black plane, and specify an edge outside the mask range as an edge on which edge outline definition is to be performed.

An image forming apparatus according to another aspect of the present disclosure includes the image processing apparatus, and performs the edge outline definition for the edge on which the edge outline definition is to be performed, while performing screen processing, to print an image having been subjected to the screen processing.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
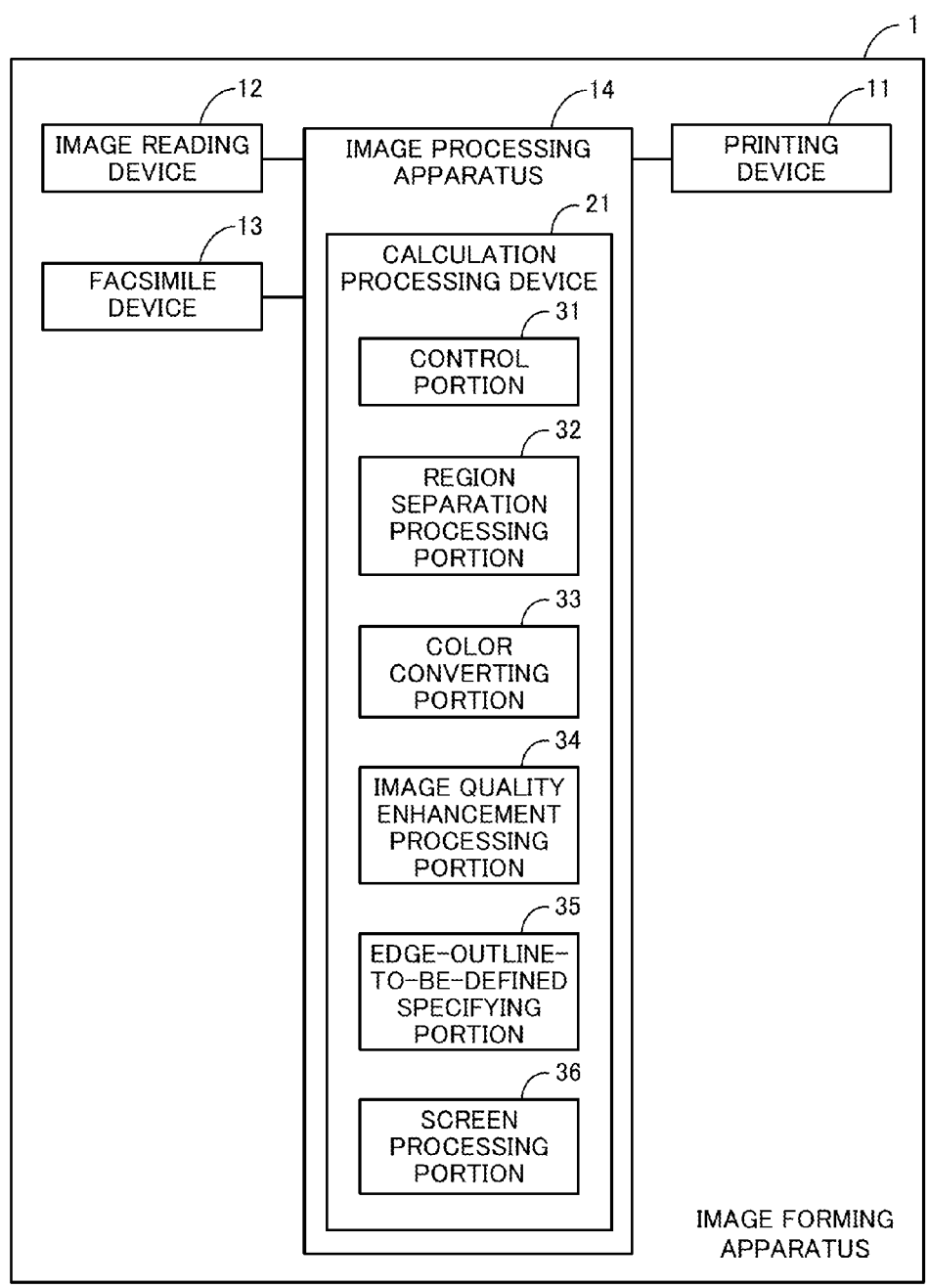
FIG. 1 is a block diagram illustrating a configuration of an image forming apparatus 1 according to an embodiment of the present disclosure.

An image forming apparatus 1 shown in FIG. 1 is a multi-function peripheral. However, the image forming apparatus 1 may be a printer, a copy machine, a facsimile machine, or the like.

The image forming apparatus 1 includes a printing device 11, an image reading device 12, a facsimile device 13, and an image processing apparatus 14.

The printing device 11 is an internal device that prints a document sheet image based on raster image data having been subjected to screen processing. For example, the printing device 11 prints a color image by using toners of four colors of CMYK according to electrophotography.

In general, a color image to be printed is formed by four planes of cyan, magenta, yellow, and black (CMYK) colors. The black color in the color image is sometimes represented as a composite black formed by all the planes having densities.

Figure 3:
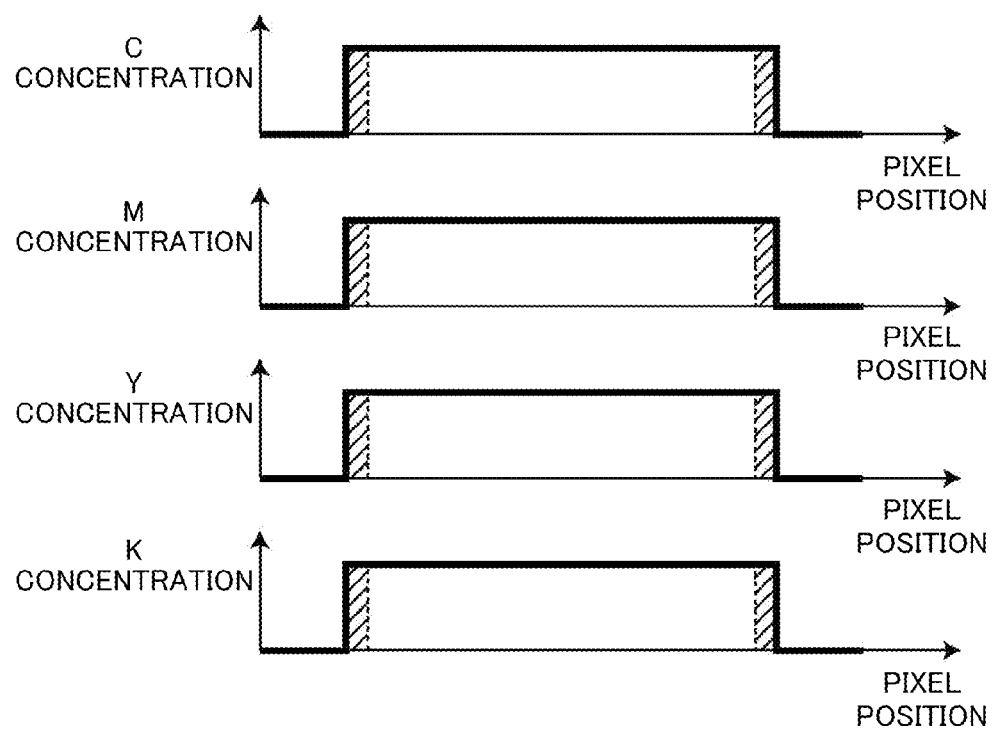
FIG. 3 illustrates a composite black region and edges of the composite black region.

FIG. 3 illustrates a composite black region and edges of the composite black region. As shown in FIG. 3, in the composite black region, all the CMYK planes have densities, and the composite black region representing a character or the like has edges (diagonal line portions in FIG. 3) in each plane.

In a case where edge outline definition is performed, in the screen processing, for an image including such a composite black region, the edge outline definition for edges of the planes of all the colors may be performed. However, in this case, a total amount of toner of the edges having been subjected to the edge outline definition is very large in printing, whereby a problem with dust of toner may arise.

Further, in some of the image forming apparatuses such as copy machines, a region separation process in which a region in an image is separated into a character region, a gradation region, and the like, may be performed. Furthermore, for a region determined as a black character region in the region separation process, portions near edges of the region are converted from a composite black to a pure black (black represented as a value of a K plane by values of planes other than the K plane being set as zero) in some cases.

Figure 4:
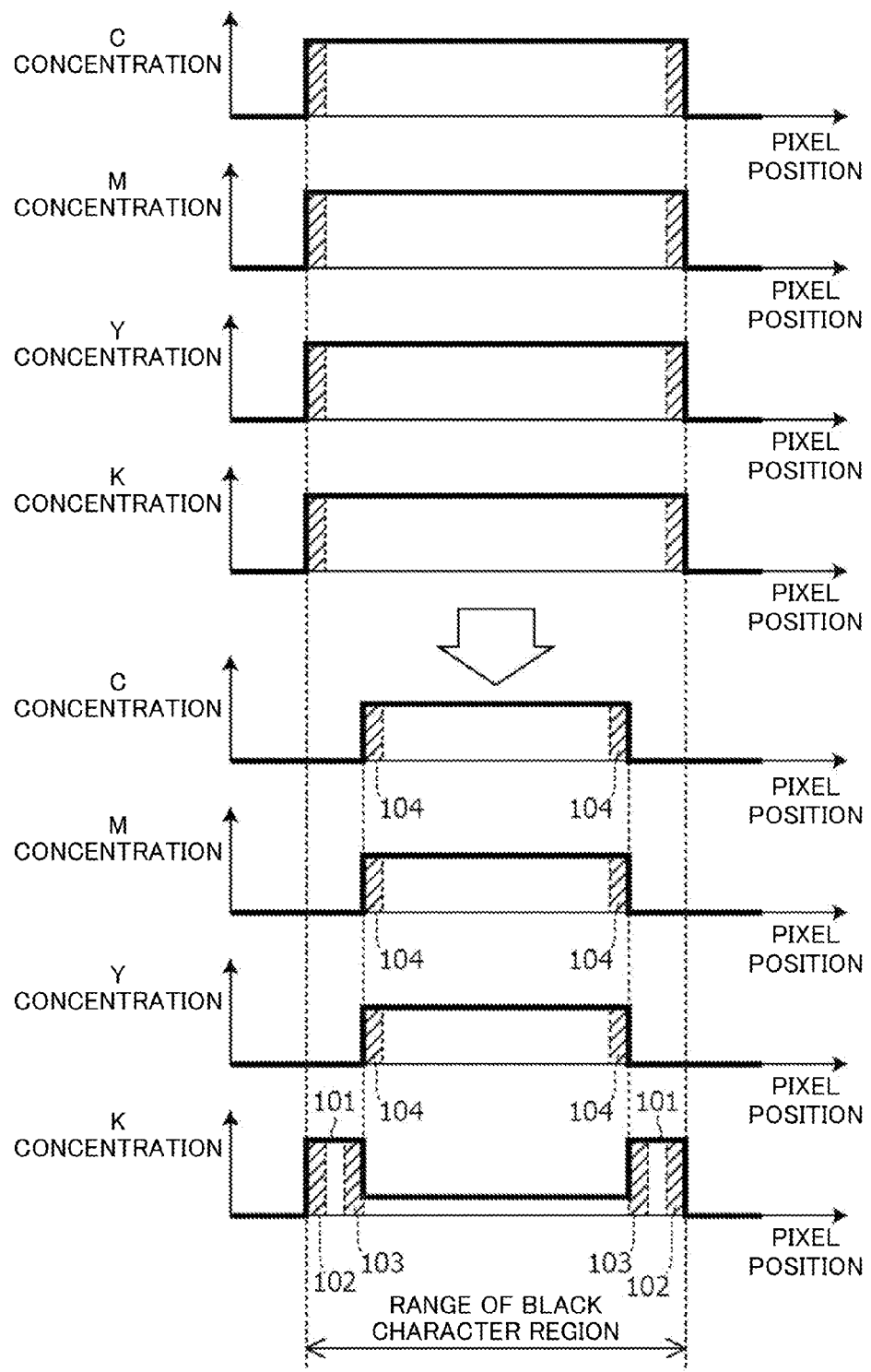
FIG. 4 illustrates conversion of portions near edges of a black character region from a composite black to a pure black.

FIG. 4 illustrates conversion of portions near edges of a black character region from a composite black to a pure black. As shown in FIG. 4, portions 101 near edges of the black character region are converted to the pure black, and the internal region other than the portions 101 near the edges is left so as to have the composite black. In this case, as shown in FIG. 4, in the K plane, edges 102 and 103 are positioned at both ends of each of the portions 101 near the edges, and in each of the CMY planes, edges 104 are positioned in the black character region.

Therefore, as shown in FIG. 4, in the screen processing for an image for which the portions near the edges have been converted from the composite black to the pure black, in a case where the edge outline definition is performed for the edges of the black character region, the edge outline definition is performed for the edges 103 and 104 in the character region in the CMYK planes, whereby an image quality obtained by the screen processing may be degraded. On the other hand, in the image forming apparatus 1, the image reading device 12 allows the edge outline definition to be performed without degrading an image quality obtained by the screen processing for a color image.

The image reading device 12 is an internal device that optically reads a document sheet image from a document sheet, and generates image data of the document sheet image.

The facsimile device 13 is an internal device that generates facsimile signals based on image data of a document sheet image to be transmitted and transmits the facsimile signals through a predetermined communication path, and that receives facsimile signals through a predetermined communication path and converts the facsimile signals to image data.

The image processing apparatus 14 performs image processing such as region separation, color conversion, and screen processing for the image data generated by the image reading device 12 and the like.

The image processing apparatus 14 includes a calculation processing device 21. The calculation processing device 21 is implemented by an ASIC (Application Specific Integrated Circuit) or a microcomputer, and functions as various processing portions. The calculation processing device 21 functions as a control portion 31, a region separation processing portion 32, a color converting portion 33, an image quality enhancement processing portion 34, an edge-outline-to-be-defined specifying portion 35, and a screen processing portion 36.

The control portion 31 controls the printing device 11, the image reading device 12, and the facsimile device 13, and obtains image data of a document sheet image from the image reading device 12 and the facsimile device 13 or causes the printing device 11 to print a document sheet image.

The region separation processing portion 32 specifies a character region, a gradation region, and the like in the document sheet image, and separates the document sheet image into the character region, the gradation region, and the like.

The color converting portion 33 converts the image data of the document sheet image from, for example, RGB color data to CMYK color data corresponding to toner colors (CMYK) for the printing device 11.

The color converting portion 33 specifies, as a black determination region, a region having a composite black in the CMYK color data obtained by the conversion. The color converting portion 33 converts, to portions of a pure black, a portion near one of edges of a range (hereinafter, referred to as a black determination range), in the primary scanning direction and/or the secondary scanning direction, of the black determination region, and a portion near the other of the edges of the black determination range, as shown in FIG. 4.

The image quality enhancement processing portion 34 performs, for example, smoothing process of an image having been subjected to the screen processing.

The edge-outline-to-be-defined specifying portion 35 sets a portion, of the black determination range described above, inward of one of the edges of the black determination range and the other of the edges of the black determination range, as a mask range, for the black plane (K plane). The edge-outline-to-be-defined specifying portion 35 specifies edges outside the mask range, as edges to be subjected to the edge outline definition.

Further, the edge-outline-to-be-defined specifying portion 35 sets the entirety of the above-described black determination range, as a mask range, for each of the color planes other than the black plane, and specifies edges outside the mask range, as edges to be subjected to the edge outline definition.

The black determination range is specified based on a pixel value of the black plane, and a pixel value of each of the remaining color planes.

For example, the black determination range is specified as a portion in which a sum $(dk + MIN(dc, dm, dy))$ of a pixel value $dk$ of the black plane, and a minimum value of each of pixel values $dc$, $dm$, and $dy$ of the remaining color planes is greater than a predetermined threshold value $Th$. The predetermined threshold value $Th$ is set so as to be less than a maximum density value. For example, in a case where a pixel value of each plane is 8-bit data, the maximum density value is 255, and the threshold value $Th$ is set so as to be less than 255, for example, set as 196.

Figure 2A:
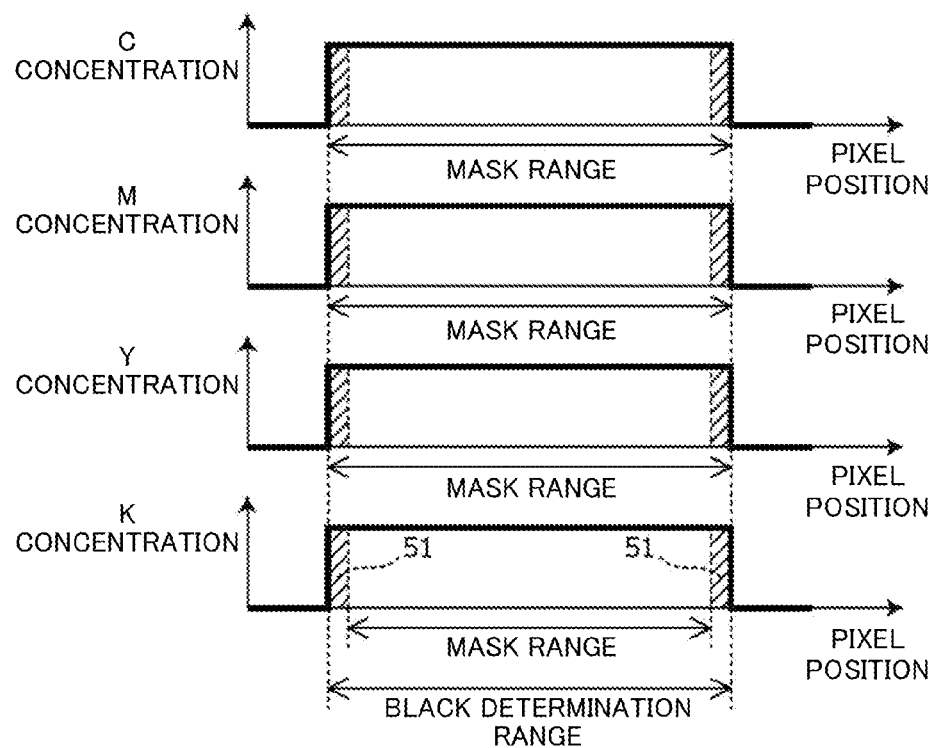
FIG. 2A and FIG. 2B illustrate mask ranges specified by an edge-outline-to-be-defined specifying portion shown in FIG. 1.
Figure 2B:
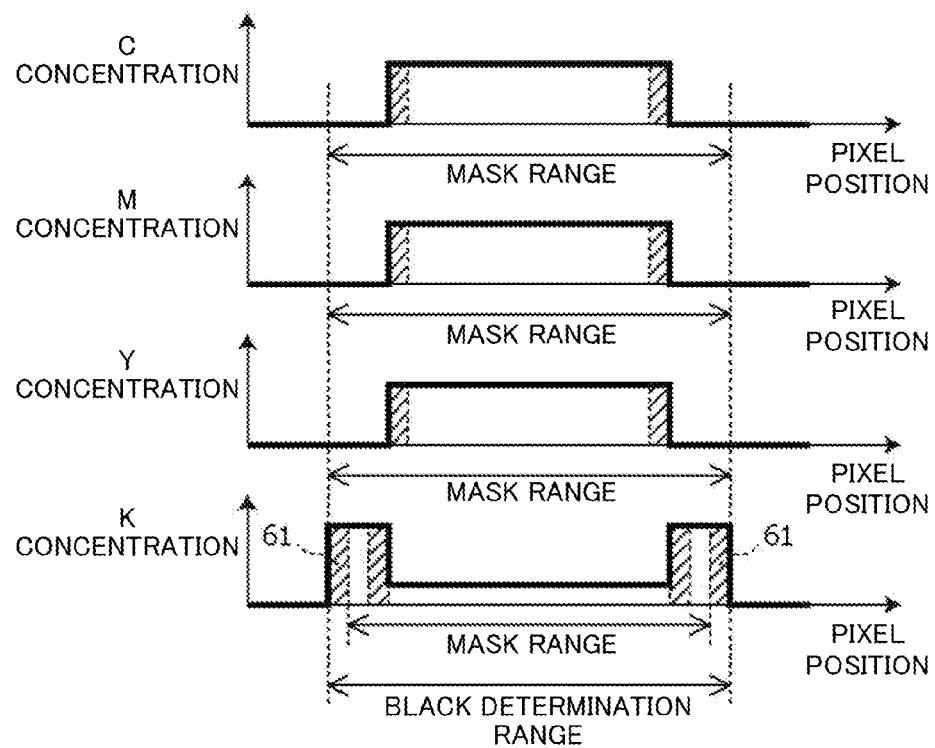

FIGS. 2A and 2B illustrate mask ranges specified by the edge-outline-to-be-defined specifying portion 35 shown in FIG. 1.

FIG. 2A illustrates an exemplary density distribution of each of the CMYK planes in the black determination range of a gradation region. In the black determination range of the gradation region, conversion from the composite black to the pure black as described above is not performed. The entirety (namely, a range from one of the edges of the black determination range to the other of the edges thereof) of the black determination range of the gradation region is set as the mask range for each of the CMY planes. On the other hand, for the black plane, a range, of the black determination range of the gradation region, positioned inward of edges 51 at both ends of the black determination range, is set as the mask range.

FIG. 2B illustrates an exemplary density distribution of each of the CMYK planes in the black determination range of a character region. In the black determination range of the character region, conversion of the portions near the edges from the composite black to the pure black as described above is performed. The entirety (namely, a range from one of the edges of the black determination range to the other of the edges thereof) of the black determination range of the character region is set as the mask range for each of the CMY planes. On the other hand, for the black plane, a range, of the black determination range of the character region, positioned inward of edges 61 at both ends of the black determination range, is set as the mask range.

Namely, in each of the CMY planes, regardless of a kind of the region (whether the region is the character region or the gradation region), the entirety (namely, a range from one of the edges of the black determination range to the other of the edges thereof) of the black determination range is set as the mask range. On the other hand, in the black plane, regardless of a kind of the region (whether the region is the character region or the gradation region), ranges positioned inward of the outermost edges 51 and 61 of the black determination ranges are set as the mask ranges.

Therefore, the edge-outline-to-be-defined specifying portion 35 appropriately specifies an edge on which the edge outline definition is to be performed, without consideration of a kind of the region (the character region or the gradation region). Namely, even when region kind information of each pixel cannot be obtained in the region separation process, the edge-outline-to-be-defined specifying portion 35 can appropriately specify an edge on which the edge outline definition is to be performed.

Further, the screen processing portion 36 performs the edge outline definition for an edge specified by the edge-outline-to-be-defined specifying portion 35 (namely, performs no edge outline definition for an edge that is not specified by the edge-outline-to-be-defined specifying portion 35), while performing the screen processing for each of the CMYK planes. The edge outline definition may be performed in the method described in, for example, Japanese Laid-Open Patent Publication No. 2012-95172 or 2012-95173.

Next, an operation of the image forming apparatus will be described.

The control portion 31 obtains image data of a document sheet image from the image reading device 12 in, for example, a copy job.

The region separation processing portion 32 performs the region separation process for the document sheet image. Based on a result of the region separation process, processing such as adaptive filtering according to a kind of the region is performed. For example, smoothing process is performed for the gradation region and edge sharpening is performed for the character region.

The color converting portion 33 converts the image data from RGB data to CMYK data, and converts portions near edges of the black character region from a composite black to a pure black as described above.

Next, the image quality enhancement processing portion 34 performs, for example, smoothing process for the document sheet image having been processed by the color converting portion 33.

The edge-outline-to-be-defined specifying portion 35 specifies an edge on which the edge outline definition is to be performed, in the image having been subjected to the screen processing, for each plane in the document sheet image, as described above.

The screen processing portion 36 performs, for each plane, the screen processing for the document sheet image having been processed by the image quality enhancement processing portion 34, while performing the edge outline definition for the edge specified by the edge-outline-to-be-defined specifying portion 35.

When image data, having been subjected to the screen processing, for which the edge outline definition has been performed for the edge specified by the edge-outline-to-be-defined specifying portion 35, is thus obtained, the control portion 31 causes the printing device 11 to print an image based on the image data.

According to the present embodiment, as described above, the color converting portion 33 converts a portion near one of the edges of the black determination range determined as having the composite black, and a portion near the other of the edges thereof, so as to have the pure black. Further, the edge-outline-to-be-defined specifying portion 35 sets a range, of the black determination range, positioned inward of one of the edges of the black determination range and the other of the edges of the black determination range, as the mask range, for the black plane. The edge-outline-to-be-defined specifying portion 35 specifies edges outside the mask range, as edges on which the edge outline definition is to be performed.

Thus, the edge outline definition is performed such that the edge outline definition is not performed for edges in the black determination range, therefore an image quality of a color image obtained by the screen processing is not degraded.

The above embodiment is a embodiment of the present disclosure. However, the present disclosure is not limited to the above embodiment. Various modifications and changes can be devised without departing from the gist of the present disclosure.

For example, in the above embodiment, the black determination range may be specified as a portion in which (a) a sum (dk+MIN(dc, dm, dy)) of a pixel value of the black plane and a minimum value of each of pixel values of the remaining color planes is greater than a first predetermined threshold value Th, and (b) a saturation indicates a value less than a second predetermined threshold value Th2.

It is to be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. An image processing apparatus comprising:
   a color converting portion configured to convert, for a black determination range determined as having a composite black, a portion near one of edges of the black determination range and a portion near the other of the edges thereof to a pure black; and
   an edge-outline-to-be-defined specifying portion configured to, for a black plane, set a mask range of the black determination range, the mask range positioned inward of the edges of the black determination range, and specify an edge outside the mask range as an edge on which edge outline definition is to be performed, wherein the black determination range is specified as a portion in which a sum of a pixel value of the black plane and a minimum value of a pixel value of each of the color planes other than the black plane is greater than a predetermined threshold value.

2. The image processing apparatus according to claim 1, wherein the edge-outline-to-be-defined specifying portion sets, for color planes other than the black plane, the entirety of the black determination range, as a mask range, and specifies an edge outside the mask range as an edge on which the edge outline definition is to be performed.

3. The image processing apparatus according to claim 1, wherein the predetermined threshold value is less than a maximum density value.

4. An image processing apparatus comprising:
   a color converting portion configured to convert, for a black determination range determined as having a composite black, a portion near one of edges of the black determination range and a portion near the other of the edges thereof to a pure black; and
   an edge-outline-to-be-defined specifying portion configured to, for a black plane, set a mask range of the black determination range, the mask range positioned inward of the edges of the black determination range, and specify an edge outside the mask range as an edge on which edge outline definition is to be performed;
   wherein the black determination range is specified as a portion in which a sum of a pixel value of the black plane and a minimum value of a pixel value of each of the color planes other than the black plane is greater than a first predetermined threshold value, and a saturation indicates a value less than a second predetermined threshold value.

5. An image forming apparatus comprising an image processing apparatus; wherein
   the image processing apparatus includes:
   a color converting portion configured to convert, for a black determination range determined as having a composite black, a portion near one of edges of the black determination range and a portion near the other of the edges thereof to a pure black; and
   an edge-outline-to-be-defined specifying portion configured to, for a black plane, set a mask range of the black determination range, the mask range positioned inward of the edges of the black determination range, and specify an edge outside the mask range as an edge on which edge outline definition is to be performed;
   the black determination range is specified as a portion in which a sum of a pixel value of the black plane and a minimum value of a pixel value of each of the color planes other than the black plane is greater than a predetermined threshold value; and
   the edge outline definition is performed for the edge on which the edge outline definition is to be performed, while screen processing is performed, to print an image having been subjected to the screen processing.

6. The image forming apparatus according to claim 5, wherein the edge-outline-to-be-defined specifying portion sets, for color planes other than the black plane, the entirety of the black determination range, as a mask range, and specifies an edge outside the mask range as an edge on which the edge outline definition is to be performed.

7. The image forming apparatus according to claim 5, wherein the predetermined threshold value is less than a maximum density value.

8. An image forming apparatus comprising an image processing apparatus; wherein
the image processing apparatus includes:
 a color converting portion configured to convert, for a black determination range determined as having a composite black, a portion near one of edges of the black determination range and a portion near the other of the edges thereof to a pure black; and
 an edge-outline-to-be-defined specifying portion configured to, for a black plane, set a mask range of the black determination range, the mask range positioned inward of the edges of the black determination range, and specify an edge outside the mask range as an edge on which edge outline definition is to be performed;
the black determination range is specified as a portion in which a sum of a pixel value of the black plane and a minimum value of a pixel value of each of the color planes other than the black plane is greater than a first predetermined threshold value, and a saturation indicates a value less than a second predetermined threshold value; and
the edge outline definition is performed for the edge on which the edge outline definition is to be performed, while screen processing is performed, to print an image having been subjected to the screen processing.

\* \* \* \* \*